(12) United States Patent
Forrester (10) Patent No.: US 7,035,654 B2
(45) Date of Patent: Apr. 25, 2006

(54) SYSTEM AND METHOD FOR PROVIDING GPS-ENABLED WIRELESS COMMUNICATIONS

(75) Inventor: Tim Forrester, San Diego, CA (US)

(73) Assignee: Kyocera Wireless Corp., San Diego, CA (US)

(*) Notice: Subject to any disclaimer, the term of this patent is extended or adjusted under 35 U.S.C. 154(b) by 391 days.

(21) Appl. No.: 10/080,948

(22) Filed: Feb. 21, 2002

(65) Prior Publication Data

US 2003/0013470 A1   Jan. 16, 2003

Related U.S. Application Data

(63) Continuation-in-part of application No. 09/902,035, filed on Jul. 10, 2001.

(51) Int. Cl.
*H04B 15/00* (2006.01)
*H04B 7/05* (2006.01)
*H04B 7/01* (2006.01)
*H04B 7/15* (2006.01)

(52) U.S. Cl. ............... 455/506; 455/78; 455/456.1; 701/213; 342/350

(58) Field of Classification Search ........... 455/506, 455/78, 80, 456.1, 456.2, 456.3, 456.4, 456.5, 455/456.6; 342/357.12, 352, 358, 357.15, 342/357.16, 357.17, 357.01, 357.02, 357.03, 342/357.04, 357.05, 357.06, 357.07, 357.08, 342/357.09, 357.1, 357.11, 357.13, 357.14, 342/350; 701/213, 214, 215
See application file for complete search history.

(56) References Cited

U.S. PATENT DOCUMENTS

| 3,628,149 A * | 12/1971 | Swan ...................... 375/267 |
| 5,594,454 A * | 1/1997 | Devereux et al. ...... 342/357.09 |
| 5,697,075 A | 12/1997 | Kim |
| 5,986,609 A | 11/1999 | Spall |
| 6,049,705 A | 4/2000 | Xue |
| 6,052,605 A * | 4/2000 | Meredith et al. ........... 455/561 |
| 6,433,734 B1 * | 8/2002 | Krasner ................. 342/357.09 |
| 6,525,689 B1 * | 2/2003 | Dooley et al. ......... 342/357.09 |
| 6,542,119 B1 * | 4/2003 | Howell et al. ............. 342/374 |

FOREIGN PATENT DOCUMENTS

| EP | 0620657 A1 | 10/1994 |
| EP | 1148584 A2 | 10/2001 |
| JP | 01318982 A | 12/1989 |
| WO | WO 96/29756 | 9/1996 |
| WO | WO 97/15961 | 5/1997 |
| WO | WO 01/96899 A1 | 12/2001 |

* cited by examiner

*Primary Examiner*—Nay Maung
*Assistant Examiner*—Shaima Q. Aminzay (57) ABSTRACT

Systems and methods are described that provide global positioning system (GPS) enabled wireless communications. The wireless communications system provides a switching module that is adapted to couple communications circuitry to a first antenna or a second antenna as a function of communications characteristics of the first antenna or the second antenna. The switching module is also adapted to couple GPS circuitry to a first antenna or a second antenna as a function of GPS reception characteristics of the first antenna or the second antenna. The switching module may also provide the communications circuitry and the GPS circuitry with simultaneous access to different antennas.

12 Claims, 4 Drawing Sheets

SYSTEM AND METHOD FOR PROVIDING GPS-ENABLED WIRELESS COMMUNICATIONS

This is a continuation-in-part of co-pending U.S. patent application Ser. No. 09/902,035 filed on Jul. 10, 2001, and entitled "System and Method for Receiving and Transmitting Information in a Multipath Environment". Priority is claimed to the above-identified co-pending U.S. Patent Application which is hereby incorporated by reference in its entirety.

FIELD OF THE INVENTION

The present invention generally relates to a system and a method for providing GPS-enabled wireless communications.

BACKGROUND OF THE INVENTION

A signal that is received or transmitted by a conventional wireless communications device in a wireless communications network is influenced by the surrounding environment. In theory, a conventional wireless communications device that has a single antenna 200 would have a radiation pattern as shown in a polar plot illustrated in FIG. 3. The single antenna 200 has an isotropic radiation pattern 210 illustrated with an isotropic gain line 220 of, for example, 0 dBi. Although radiation patterns are three dimensional, it is understood that the polar plots are merely two-dimensional representations. Thus, a polar plot may represent, for example, a cross section of a three-dimensional radiation pattern. In addition, the phrase "radiation pattern" is to be defined as including at least transmission patterns or reception patterns. The isotropic radiation pattern 210 is a theoretical, ideal model occurring, for example, in the remote vacuum of space with a point source of radiation.

Figures 3, 4:
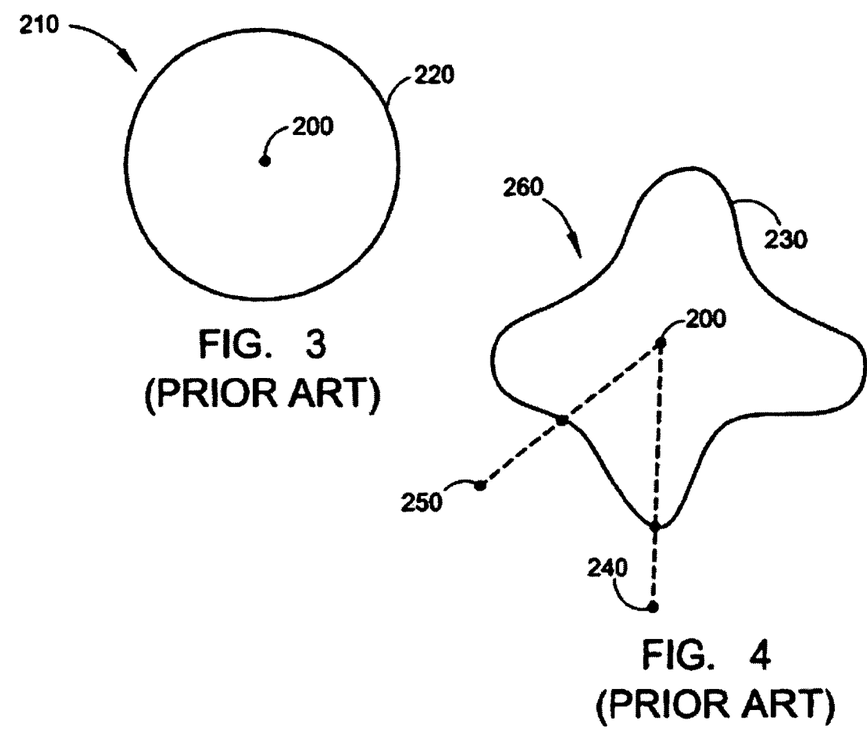
FIG. 3 shows a polar plot of an isotropic radiation pattern for a conventional antenna.
FIG. 4 shows a polar plot of a radiation pattern in a multipath environment for a conventional antenna.

In practical settings, for example, in an urban environment, multipath and other considerations create nonuniformities in the radiation patterns. A signal may bounce off, for example, the ground, buildings, walls or other reflecting structures before reaching the single antenna 200 of the conventional wireless communications device. Furthermore, since a signal may be scattered simultaneously across a plurality of paths in space and time before reaching the single antenna, the signal may interfere constructively and destructively with itself. FIG. 4 shows another polar plot illustrating an example of a multipath radiation pattern 260 including a gain line 230 generated from the single antenna 200. The gain line 230 has been distorted due to multipath interference. Thus, for example, points 240, 250, although equidistant from the single antenna, effectively see different radiation patterns in which the point 240 sees greater signal gain than the point 250.

Therefore, a user of the conventional wireless communications device, that is suffering from poor reception or transmission due to multipath conditions, typically may need to physically move around in a random search for an improved signal (e.g., move from the point 250 to the point 240 without knowledge of the shape of the radiation pattern 260). Such physical translations of the conventional wireless communications device are not convenient and may not even be available under certain conditions such as, for example, when the user may not be free to move around.

Figure 5:
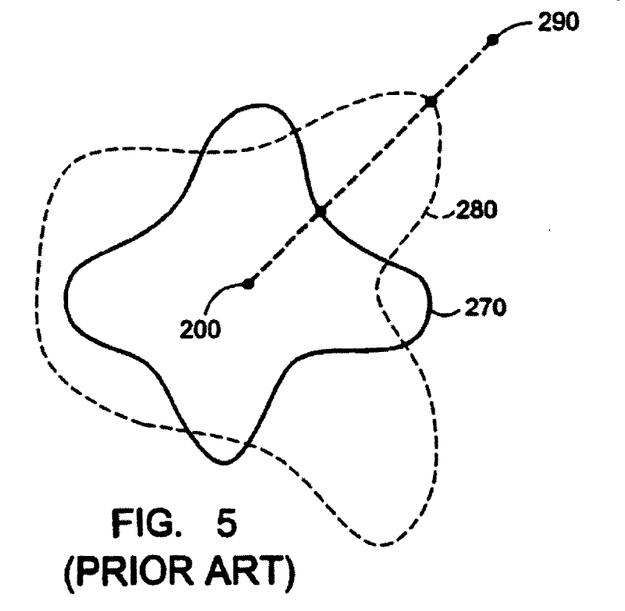
FIG. 5 shows a polar plot of a radiation pattern at different frequencies in a multipath environment for a conventional antenna.

In addition, since multipath effects result, in part, from constructive and destructive interference of signals, multipath effects differ at different signal frequencies. Thus, for example, as shown in a polar plot illustrated in FIG. 5, a first gain line 270 is generated by the single antenna 200 at a first frequency $f_1$ and a second gain line 280 is generated by the single antenna 200 at a second frequency $f_2$.

The conventional wireless communications device may transmit and receive signals at different frequencies. Thus, for example, via the single antenna, the conventional wireless communications device may transmit at the first frequency $f_1$ and receive at the second frequency $f_2$. The conventional wireless communications device effectively experiences, for example, a radiation pattern for transmission as represented by the gain line 270 and a radiation pattern for reception as represented by the gain line 280. The consequences during, for example, two-way wireless communications between the single antenna 200 and a point 290 (e.g., a base station) are further illustrated in FIG. 5. The point 290 and the antenna 200 effectively experience disparate radiation patterns depending upon whether the single antenna 200 is transmitting or receiving. In this case, the single antenna 200 effectively experiences substantially more gain in receiving signals from the point 290 than in transmitting signals to the point 290. Thus, it is possible, for example, that although the signal from the point 290 is successfully received, the signal transmitted to the point 290 may be lost.

SUMMARY OF THE INVENTION

The present invention alleviates to a great extent the disadvantages of conventional apparatus and methods for receiving and transmitting information in wireless communications system.

In a preferred embodiment, the present invention provides a system and a method for global positioning system (GPS) enabled wireless communications. The wireless communications system provides a switching module that is adapted to couple communications circuitry to a first antenna or a second antenna as a function of communications characteristics of the first antenna or the second antenna. The switching module is also adapted to couple GPS circuitry to a first antenna or a second antenna as a function of GPS reception characteristics of the first antenna or the second antenna.

The present invention has an advantage in that a wireless communications device may provide the first antenna and the second antenna from which the wireless communications device can select to optimize, for example, GPS reception characteristics. Furthermore, the wireless communications device may automatically couple the GPS module to the antenna that provides the best GPS reception characteristics.

The present invention also has an advantage in that the switching module may also provide the communications circuitry and the GPS circuitry with simultaneous access to different antennas.

These and other features and advantages of the present invention will be appreciated from a review of the following detailed description of the present invention, along with the accompanying figures in which like reference numerals refer to like parts throughout.

DETAILED DESCRIPTION OF THE INVENTION

Figure 1A:
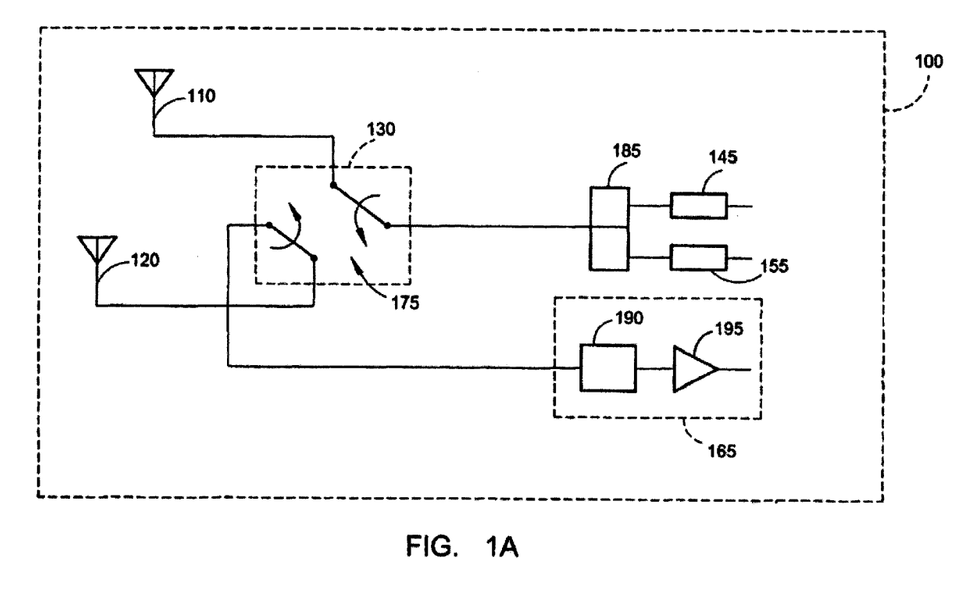
FIG. 1A shows a schematic representation of some components of a wireless communications device according to the present invention.
Figure 1B:
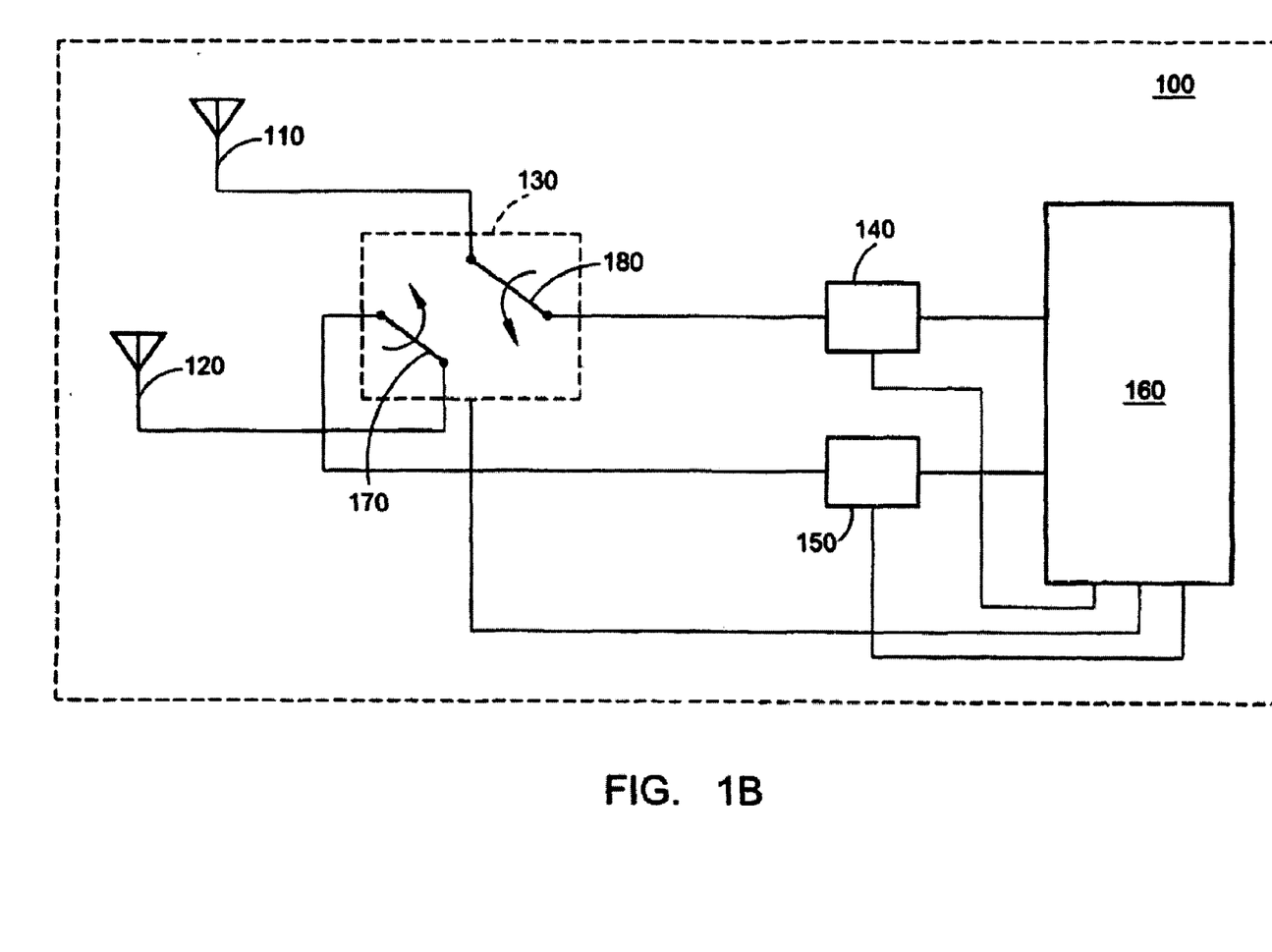
FIG. 1B shows a schematic representation of some components of a wireless communications device according to the present invention.

FIG. 1B illustrates an exemplary embodiment of a wireless communications system including a wireless communications device 100 according to the present invention. The wireless communications device 100 may include, for example, a handheld wireless communications device, a mobile phone, a car phone, a cellular or a personal communications services (PCS) phone, a cordless phone, a laptop computer or other computing device with a wireless modem, a pager or a personal digital assistant (PDA). The wireless device 100 may be digital or analog or some combination thereof. Indeed, the present invention also contemplates other forms of wireless communications devices known to one of ordinary skill in the art.

The wireless communications device 100 may include, for example, a first antenna 110, a second antenna 120, a switching module 130, a transmitter module 140, a receiver module 150 and a main controller 160. The switching module 130 may include, for example, a receiver switch 170 and a transmitter switch 180. The main controller 160 may include, for example, a mobile station modem (MSM) or other processor that is programmable. The wireless communications device 100 may also include other components (e.g., duplexers, diplexers, amplifiers, mixers, filters, oscillators, etc.) which are known to one of ordinary skill in the art and not shown or described further herein.

Figure 2A:
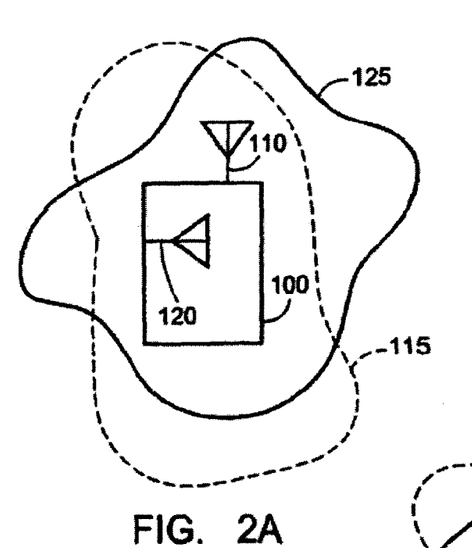
FIG. 2A is an illustration of a wireless device according to the present invention.
Figure 2B:
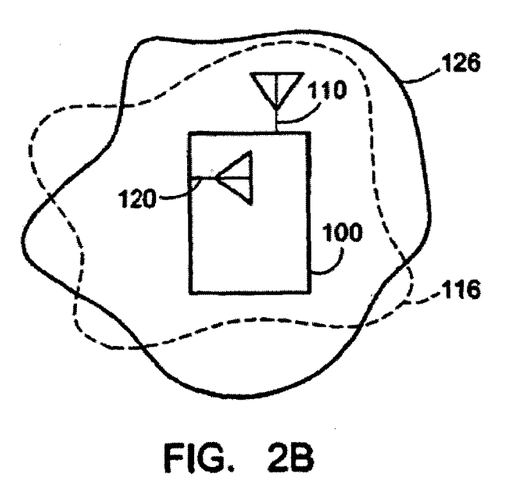
FIG. 2B is an illustration of a wireless device according to the present invention.

Referring now to FIGS. 2A and 2B, the wireless communications device 100 is shown in one possible arrangement. In this example, the wireless communications device 100 includes two antennas: the first antenna 110 in a first orientation, and the second antenna 120 oriented in a second orientation. Preferably, the first antenna 110 will be positioned in an orthogonal relationship or in another relationship that accentuates differing gain patterns from the first antenna 110 and the second antenna 120. Also, in this example, the first antenna 110 is mounted such that the antenna extends, at least in part, outside the housing of the wireless communications device 100, while the second antenna 120 is mounted inside the housing. It will be appreciated that other antenna mounting orientations and locations may be selected to support specific applications and aesthetic considerations.

In the illustrated example, the wireless communications device 100 transmits at frequency $f_1$ as shown in FIG. 2A and receives at frequency $f_2$ as shown in FIG. 2B. As previously described, it is likely that each antenna 110, 120 will have a different gain line at the frequency $f_1$ as compared to the gain line at the frequency $f_2$. For example, the first antenna 110 has a radiation pattern with a gain line 115 when operating at the frequency $f_1$ as illustrated in FIG. 2A and a radiation pattern with a gain line 116 when operating at frequency $f_2$ as illustrated in FIG. 2B. In a similar manner, the second antenna 120 has a radiation pattern with a gain line 125 when operating at frequency $f_1$ as illustrated in FIG. 2A and a radiation pattern with a gain line 126 when operating at frequency $f_2$ as illustrated in FIG. 2B.

The wireless communications device 100 advantageously uses the difference in gain lines, such as, for example, between the gain line 115 and the gain line 125 or between the gain line 116 and the gain line 126, to enhance operation of the wireless communications device 100. For example, the wireless communications device 100 may determine which of the first antenna 110 or the second antenna 120 is better for transmitting or receiving a communications signal and may select the better antenna for current communications. In such a manner, more consistent signal quality may be obtained, which may, for example, reduce dropped calls, enable lower power usage, or permit faster data transmissions. Since gain lines may vary in response, for example, to movements of the wireless communications device 100 or to changes in the environment, the wireless communications device 100 may continually determine and select the better antenna. Accordingly, the wireless communications device 100 may maintain a more consistent signal quality even when moving or when operated in an active, dynamic environment.

Referring again to FIG. 1B, the wireless communications device 100 is described in more detail. The main controller 160 is coupled to the transmitter module 140, the receiver module 150 and the switching module 130. The transmitter module 140 is coupled to the transmitter switch 180 of the switching module 130. Via the transmitter switch 180, the transmitter module 140 can be coupled to one of the first antenna 110 or the second antenna 120. The receiver module 150 is coupled to the receiver switch 170 of the switching module 130. Via the receiver switch 170, the receiver module 160 can be coupled to one of the first antenna 110 or the second antenna 120.

Although illustrated as being in generally in the same direction, the first antenna 110 and the second antenna 120 can be disposed at an angle to each other. For example, the first antenna 110 is preferably disposed in a direction that is approximately orthogonal to the second antenna 120. Since the orientation of an antenna affects its radiation pattern, the first antenna 110 and the second antenna 120 may have different radiation patterns. Thus, the second antenna 120 may provide an alternative radiation pattern for the wireless communications device 100.

In operation according to an exemplary embodiment, the main controller 160 receives a signal from a base station of a wireless communications network via the first antenna 110 or the second antenna 120. Based on the signal, the main controller 160 sets the transmitting module 140 to transmit, for example, at a frequency $f_1$ and the receiving module 150 to receive at a frequency $f_2$. The main controller 160 can evaluate which antenna 110, 120 provides the best reception characteristics at the frequency $f_2$ in the present environment, which may include multiple paths. The main controller 160 can also evaluate which antenna 110, 120 provides the best transmission characteristics (e.g., signal strength, clarity, bit error rate, etc.) at the frequency $f_1$ in the present environment. The evaluations can take place periodically or aperiodically (e.g., triggered by a particular condition). Based on the evaluations, the main controller 160 can control the switching module 130 to switch the transmitter module 140 or the receiver module 150 to the appropriate antenna 110, 120.

For example, during two-way communications between the wireless communications device 100 and a base station in a wireless communications network (e.g., a two-way conversation between connected callers), the main controller 160 may determine, for example, that for the assigned channel at frequency $f_2$, the first antenna 110 provides superior reception to the second antenna 120 in the present environment. Thus, the main controller 160 sends a control signal to the switching module 130 that causes the first switch 170 to couple the receiver module 150 to the first antenna 110. The main controller 160 may also determine, for example, that for the assigned channel at frequency $f_1$, the first antenna 110 provides superior transmission in the present environment. Thus, the main controller 160 sends a control signal to the switching module 130 that causes the second switch 180 to couple the transmitter module 140 to the first antenna 110.

In operation according to another exemplary embodiment, the receiver module 150 is coupled to, for example, the first antenna 110 via the first switch 170 of the switching module 130. The main controller 160 monitors the reception characteristics of the first antenna 110. If the reception characteristics become poor (e.g., the bit error rate exceeds or is nearing an applicable error threshold), then the main controller 160 tests the reception characteristics of the second antenna 110. For example, the main controller 160 may control the switching module 130 such that the first switch 170 couples the receiver module 150 to the second antenna 120 in order to evaluate the reception characteristics of the second antenna 120. This can be accomplished relatively quickly. For example, if the reception characteristic of the second antenna 120 is evaluated based on, for example, the error bit rate of the second antenna 120, then an evaluation can be determined even on a bit-by-bit basis.

If the main controller 160 determines that the second antenna 120 has better reception characteristics (e.g., a lower bit error rate), then the main controller 160 may keep the receiver module 150 coupled to the second antenna 120. The main controller 160 then monitors the reception characteristics of the second antenna 120. On the other hand, if the main controller 160 determines that the second antenna 120 does not have the better reception characteristics, then the main controller 160 may control the switching module such that the first switch maintains the coupling between the receiver module 150 and the first antenna 110.

A similar procedure may be implemented by the main controller 160 in monitoring the transmission characteristics of the antennas 110, 120. For example, the main controller 160 may monitor transmission characteristics (e.g., signal strength) via feedback from the base station. Thus, if the transmission characteristics become poor (e.g., signal strength is nearing or is below a particular strength threshold) for the antenna presently in use for transmission, for example, the second antenna 120, then the main controller 160 can test the transmission characteristics of the other antenna, for example, the first antenna 110, by coupling the transmitter module 140 to the first antenna 110. In evaluating the transmission characteristic of the antennas 110, 120, the main controller 160 may use feedback information from the base station (e.g., closed loop power control). If, in this example, the first antenna 110 has the better transmission characteristics, then the main controller 160 maintains the coupling between the transmitter module 140 and the first antenna 110. The main controller 160 then monitors the transmission characteristics of the first antenna 110. On the other hand, if the main controller 160 determines that the first antenna 110 does not have the better transmission characteristics, then the main controller 160 may control the switching module such that the second switch 180 couples the transmitter module 140 to the second antenna 120.

In another exemplary embodiment, after the main controller 160 has, for example, switched antennas from the first antenna 110 to the second antenna 120 to improve, for example, transmission characteristics, the main controller 160 can then attempt to match the reception characteristics with the new transmission characteristics. In this example, if the second antenna 120 has a transmission characteristic which includes a strength parameter of a particular quantity, then the main controller 160 tests the reception characteristics of the first antenna 110 and the second antenna 120 to evaluate which one has the reception characteristic, in particular, for this example, the strength parameter, closest to the particular quantity. The antenna 110, 120 selected does not necessarily have, for example, the largest strength parameter, but only the closest matched strength parameter.

In yet another exemplary embodiment, the main controller 160 maintains a list of base stations in range for at least one of the first antenna 110 and the second antenna 120. This list can be compiled when the wireless communications device 100 receives signals from all the base stations in range of the wireless communications device 100 during, for example, a registration process or other initial process. Furthermore, the list can be updated periodically or aperiodically (e.g., triggered by a particular condition or event). Accordingly, if the transmission characteristics of the antenna presently being used for transmission becomes poor, then the main controller 160 can test the transmission characteristics for each of the antennas with each of the base stations on the list. Based upon such tests, a switch in antenna or base station may follow. If the reception characteristics of the antenna presently being used for reception becomes poor, then the main controller 160 can test the reception characteristics for each of the antennas with each of the base stations on the list. Based upon such tests, a switch in antenna or base station may follow.

FIG. 1A illustrates another exemplary embodiment of the wireless communications device 100 according to the present invention. The wireless communications device 100 may include, for example, the first antenna 110, the second antenna 120, the switching module 130, a component 185, a first module 145, a second module 155 and a global positioning system (GPS) module 165. In one example, the component 185 is a duplexer; the first module 145 includes the transmitter module 140; and the second module 155 includes the receiver module 150. The GPS module 165 may include, for example, a matching circuit 190, a low noise amplifier (LNA) 195 and GPS circuitry (not shown) that is known to one of ordinary skill in the art. Furthermore, although illustrated as a GPS module 165, the module 165 may be adapted for other communications bands as known by one of ordinary skill in the art. The switching module 130 may include a diversity switch 175 that may be structured, for example, to couple the duplexer 185 or the GPS module 165 to the first antenna 110 or the second antenna 120. The wireless communications device 100 may also include other components (e.g., amplifiers, mixers, filters, oscillators, controllers, etc.) that are known to one of ordinary skill in the art and are not shown or described further herein.

In this example, the duplexer 185 is coupled to the first module 145 and the second modules 155 which may include, for example, conventional communications components and circuitry not shown (e.g., receiving or transmitting circuitry). For example, the conventional communications components and circuitry may include conventional cellular band or PCS band transmission and reception components and circuitry. Furthermore, the conventional communications components and circuitry may or may not include at least a part of the main controller 160. Some communications components and circuitry may be coupled to the main controller 160 as understood by one of ordinary skill in the art.

The duplexer 185 is also coupled to the switching module 130 and, in particular, to a terminal of the diversity switch 175. The diversity switch 175 couples the duplexer 185 to the first antenna 110 or the second antenna 120. The control of the diversity switch 175 may be implemented, at least in part, via, for example, the conventional communications components and circuitry or the main controller 160 using methods and processes that have been adapted from those described herein.

The GPS module 165 is illustrated as including the matching circuit 190, which is coupled to the LNA 195. Other conventional GPS circuitry (not shown) may be coupled to the LNA 195 as is well known in the art. Furthermore, the GPS module 165 may or may not include at least a part of the main controller 160. The matching circuit 190, which matches the GPS module 165 with the first antenna 110 or the second antenna 120, is coupled to the switching module 130 and, in particular, a terminal of the diversity switch 175. The diversity switch 175, under the control, at least in part, of the GPS module or the main controller 160, may couple the GPS module 165 to the first antenna 110 or the second antenna 120.

Figure 1C:
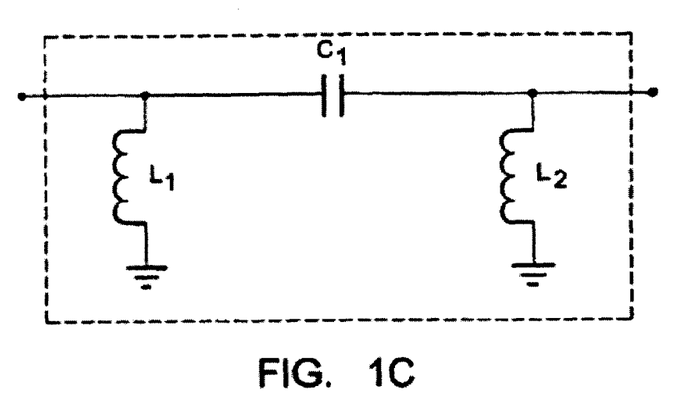
FIG. 1C shows a circuit representation of a matching circuit according to the present invention.

FIG. 1C illustrates an example of the matching circuitry 190 which includes inductors $L_1$, $L_2$ and a capacitor $C_1$ in a particular matching configuration. The matching circuit 190 may include other matching circuitry arrangements and configurations including more complex matching circuitry arrangements and configurations and their equivalents (e.g., dual equivalents). The matching circuitry 190 may include passive elements, active elements or combinations thereof. Such conventional matching arrangements, configurations and their structural and functional equivalents are available, without undue experimentation, to one of ordinary skill in the art. Furthermore, although the matching circuit 190 is illustrated in FIG. 1A as part of the GPS module, other matching circuits may be placed between the component 185 and the switching module 130 or may be part of the first module 145 or the second module 155 to optimize signal characteristics.

In operation, the wireless communications device 100 may receive a GPS signal from a GPS system (e.g., a constellation of GPS satellites or base stations). The GPS module 165 may receive the GPS signal from the first antenna 110 or the second antenna 120 via the diversity switch 175. The matching circuitry 190, for example, may provide the GPS module 165 with maximum GPS signal strength from the first antenna 110 or the second antenna 120. The GPS module 165 or the main controller 160 (e.g., the main controller 160 directly or the main controller 160 indirectly via the GPS module 165) may evaluate GPS reception characteristics (e.g., signal strength, clarity, bit error rate, etc.) on the first antenna 110 and the second antenna 120. Such an evaluation of signal strength, which can be periodic or aperiodic (e.g., triggered by a particular event or condition), can be used in switching the GPS module 165 to the antenna that can provide the GPS module 165 with the best GPS reception characteristics.

For example, the GPS module 165 may be initially coupled to the first antenna 110 via the diversity switch 175. The main controller 160, in this example, can evaluate the reception characteristics of the GPS signal on the first antenna 110. Periodically or aperiodically, the main controller 160 can cause the diversity switch 175 to couple the GPS module 165 to the second antenna 120 so that the reception characteristics of the GPS signal on the second antenna 120 can be evaluated. If the reception characteristics of the GPS signal on the second antenna 120 are superior to the reception characteristics of the GPS signal on the first antenna 110, then the GPS module 165 can continue to receive the GPS signal on the second antenna 120. Otherwise, if the reception characteristics of the GPS signal on the second antenna 120 are not superior to the reception characteristics of the GPS signal on the first antenna 110, then the main controller 160 can control the diversity switch 175 to switch the GPS module 160 back to the first antenna 110.

In another example, the GPS module 165 may be initially coupled to, for example, the second antenna 120 via the diversity switch 175. The main controller 160, for example, may periodically or aperiodically cause the diversity switch 175 to couple the GPS module 165 to the first antenna 110 to sample and to evaluate the reception characteristics on the first antenna 110. After sampling the reception characteristics of the GPS signal on the first antenna 110, the main controller 160 may control the diversity switch 175 to couple the GPS module 165 back to the second antenna 120. If the main controller 160 determines that the reception characteristics of the first antenna 110 are sufficiently superior to the reception characteristics of the second antenna 120, then the main controller 160 may cause the diversity switch 175 to couple the GPS module to the first antenna 110.

In another example, the GPS module 165 may be initially coupled to the first antenna 110 via the diversity switch 175. The main controller 160, for example, may monitor the reception characteristics of the GPS signal on the first antenna 110. If the reception characteristics of the GPS signal on the first antenna 110 become poor (e.g., the bit error rate exceeds or is nearing an applicable error threshold), then the main controller 160 may test the reception characteristics of the GPS signal on the second antenna 110. For example, the main controller 160 may control the diversity switch 175 such that the GPS module 160 receives the GPS signal from the second antenna 120. The main controller 160 can then evaluate the reception characteristics of the GPS signal on the second antenna 120. This can be accomplished relatively quickly. For example, if the reception characteristic of the second antenna 120 is evaluated based on, for example, the error bit rate of the second antenna 120, then an evaluation can be determined even on a bit-by-bit basis.

If the main controller 160 determines that the GPS signal received by the second antenna 120 has better reception characteristics (e.g., a lower bit error rate), then the main controller 160 may keep the GPS module 165 coupled to the second antenna 120. The main controller 160 can then monitor the reception characteristics of the second antenna 120. On the other hand, if the main controller 160 determines that the second antenna 120 does not have the better reception characteristics or substantially better reception characteristics, then the main controller 160 may control the diversity switch 175 such that GPS module 165 is coupled to the first antenna 110.

The wireless communications device 100 may also send or receive communications signals in a particular communications band (e.g., the cellular communications band, the PCS communications band or other communications bands known in the art) through the first antenna 110 or the second antenna 120. The main controller 160, for example, may evaluate, from the reception or transmission characteristics of the first antenna 110 or the second antenna 120, whether the duplexer 185 should be coupled to the first antenna 110 or the second antenna 120 and control the diversity switch 175 to couple the duplexer 185 to the appropriate antenna. As described above, the main controller 160 can select the first antenna 110 or the second antenna 120 to optimize reception characteristics, transmission characteristics or a combination thereof for the assigned channels. This process can be periodic or aperiodic (e.g., triggered by a condition or an event).

In another exemplary embodiment, the component 185 may be a diplexer. The diplexer 185 may then be coupled to the first module 145 which may include communications circuitry for a first communications band, for example, the cellular communications band. The diplexer 185 may also be coupled to the second module 155 which may include communications circuitry for a second communications band, for example, the PCS communications band. Accordingly, the wireless communications device 100 can provide communications over either, for example, the cellular communications band or the PCS communications band via the diplexer 185. Thus, for the communications band in use at the time by the wireless communications device 100, the main controller 160 can couple the diplexer 185 to the antenna (e.g., the first antenna 110 or the second antenna 120) that provides the best communications signal using methods and processes that have been adapted from those described herein. In addition to optimizing communications by selecting between the first antenna 110 and the second antenna 120, the main controller 160 may optimize communications by selecting between communications bands and/or channels within the communications bands.

The wireless communications device 100 can also provide simultaneously two-way wireless communications on one of the antennas and receive GPS signals on the other antenna. Thus, for example, while making a wireless telephone call, the diplexer or the duplexer 185 may be coupled to, for example, the first antenna 110. Simultaneously, the GPS module 165 can be coupled to, for example, the second antenna 120. The diversity switch 175 may or may not be structured so that no particular antenna is capable of coupling to the duplexer/diplexer 185 and the GPS module 165 at the same time. The diversity switch 175 may or may not be structured so that neither the duplexer/diplexer 185 nor the GPS module 165 is capable of coupling to both antennas at the same time.

Thus, it is seen that systems and methods for receiving and transmitting information in a wireless communications system are provided. One skilled in the art will appreciate that the present invention can be practiced by other than the preferred embodiments which are presented in this description for purposes of illustration and not of limitation, and the present invention is limited only by the claims that follow. It is noted that equivalents for the particular embodiments discussed in this description may practice the present invention as well.

What is claimed is:

1. A handheld wireless communications device, comprising:
   a first antenna;
   a second antenna;
   a switching module coupled to the first antenna and to the second antenna;
   a global positioning system (GPS) module coupled to the first antenna or the second antenna via the switching module,
   a duplexer coupled to the switching module;
   a receiver module coupled to the duplexer; and
   a transmitter module coupled to the duplexer,
   wherein the switching module is adapted to couple the GPS module to the first antenna or the second antenna as a function of a GPS reception characteristic of the first antenna or the second antenna and;
   wherein the switching module is adapted to couple the duplexer to the first antenna or the second antenna as a function of a communications reception characteristic or a communications transmission characteristic of the first antenna or the second antenna.

2. The wireless communications device according to claim 1, wherein the switching module is adapted to couple, via the duplexer, the receiver module or the transmitter module to the first antenna or the second antenna as a function of the communications reception characteristic or the communications transmission characteristic of the first antenna or the second antenna.

3. The wireless communications device according to claim 1, wherein the switching module is structured to couple simultaneously the duplexer and the GPS module to different antennas.

4. A handheld wireless communications device, comprising:
   a first antenna;
   a second antenna;
   a switching module coupled to the first antenna and to the second antenna;
   a global positioning system (GPS) module coupled to the first antenna or the second antenna via the switching module,
   a diplexer coupled to the switching module;
   a first communications band module coupled to the diplexer; and
   a second communications band module coupled to the diplexer,
   wherein the switching module is adapted to couple the GPS module to the first antenna or the second antenna as a function of a GPS reception characteristic of the first antenna or the second antenna and;
   wherein the switching module is adapted to couple the diplexer to the first antenna or the second antenna as a function of a communications reception characteristic or a communications transmission characteristic of the first antenna or the second antenna.

5. The wireless communications device according to claim 4, wherein the switching module is adapted to couple, via the diplexer, the first communications band module or the second communications band module to the first antenna or the second antenna as a function of the communications reception characteristic or the communications transmission characteristic of the first antenna or the second antenna.

6. The wireless communications device according to claim 5, wherein the switching module is structured to couple simultaneously the diplexer and the GPS module to different antennas.

7. The wireless communications device according to claim 4, wherein the first communications band module includes cellular band communications circuitry, and
   wherein the second communications band module includes PCS band communications circuitry.

8. A system for providing wireless communications, comprising:

a first antenna;
a second antenna;
a GPS module;
means for selecting one of the first antenna or the second antenna for use in receiving GPS information as a function of GPS receiving characteristics of the first antenna or the second antenna;
means for coupling the received GPS information to a GPS module via one of the first antenna or the second antenna as selected by the selecting means; and
means for coupling a communications transmitter module or a communications receiver module to the first antenna or the second antenna as selected by means for selecting the first antenna or the second antenna as a function of communications transmission characteristics or communications reception characteristics of the first antenna or the second antenna.

9. The system according to claim 8, wherein the GPS module and the communications transmitter module or the communications receiver module simultaneously use different antennas.

10. The system according to claim 8, further comprising:
means for communicating over a first communications band;
means for communicating over a second communications band; and
means for coupling communications information over the first communications band or the second communications band via the first antenna or the second antenna as selected by means for selecting the first antenna or the second antenna as a function of communications reception characteristics or communications transmission characteristics of the first antenna or the second antenna.

11. The system according to claim 10, wherein the GPS module and the first communications band means or the second communications band means simultaneously use different antennas.

12. A method for providing a global positioning system (GPS) enabled wireless communications device, comprising the steps of:
(a) selecting a first antenna or a second antenna for use in receiving GPS information as a function of GPS receiving characteristics of the first antenna or the second antenna;
(b) coupling the GPS information to a GPS signal processor via one of the first antenna or the second antenna as selected in step (a); and
(c) simultaneously receiving the GPS information and two-way wireless communications information over respective antennas via a diversity switch.

* * * * *